Nov. 18, 1947.　　　E. J. PANISH　　　2,431,275
CLUTCH CONTROL DEVICE
Original Filed Aug. 14, 1940　　4 Sheets-Sheet 1

INVENTOR
Erwin J. Panish,
BY Johnson, Klein & Smyth
ATTORNEYS

Nov. 18, 1947.  E. J. PANISH  2,431,275
CLUTCH CONTROL DEVICE
Original Filed Aug. 14, 1940  4 Sheets-Sheet 2
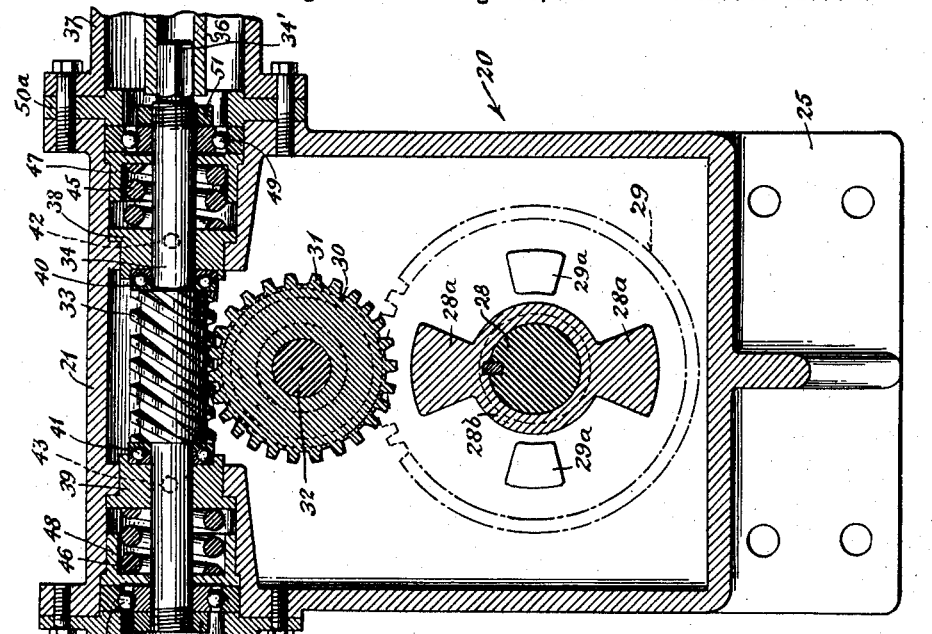
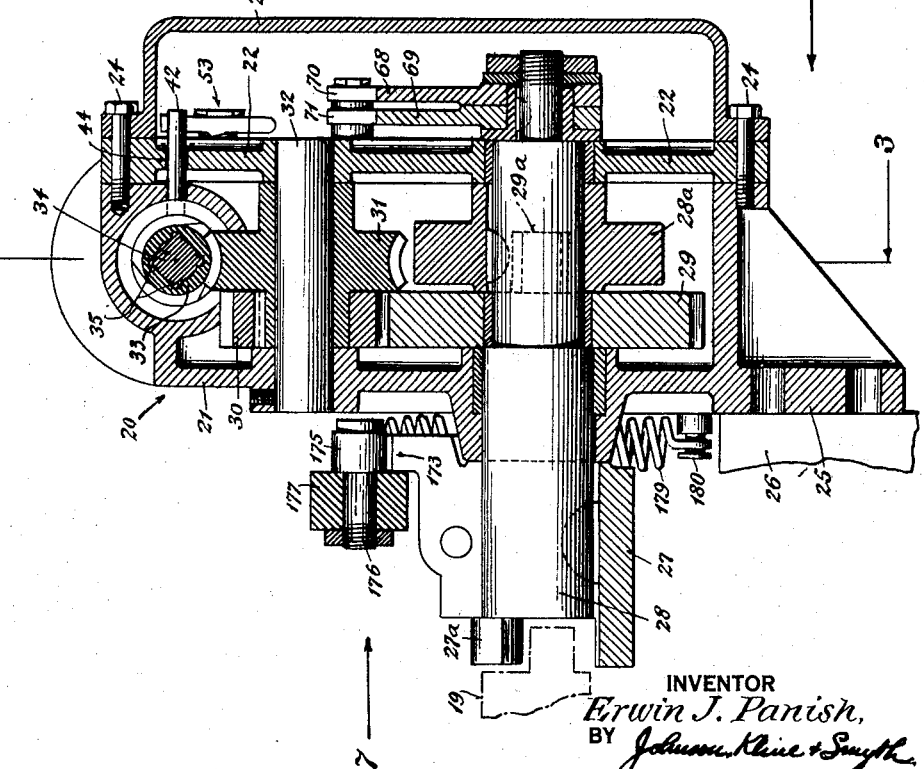
INVENTOR
*Erwin J. Panish,*
BY *Johnson, Kline & Smyth*
ATTORNEYS

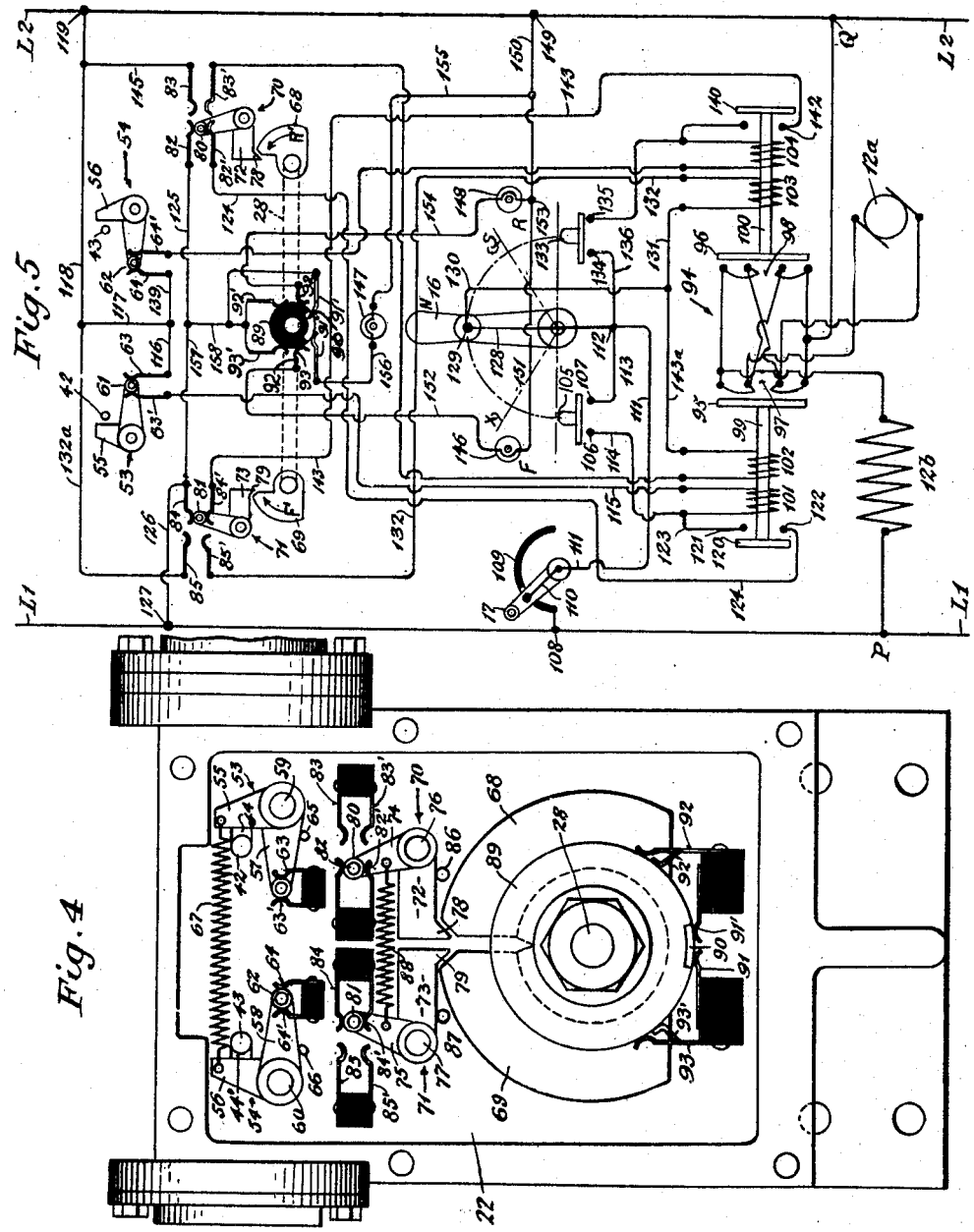

Nov. 18, 1947.  E. J. PANISH  2,431,275
CLUTCH CONTROL DEVICE
Original Filed Aug. 14, 1940  4 Sheets-Sheet 4
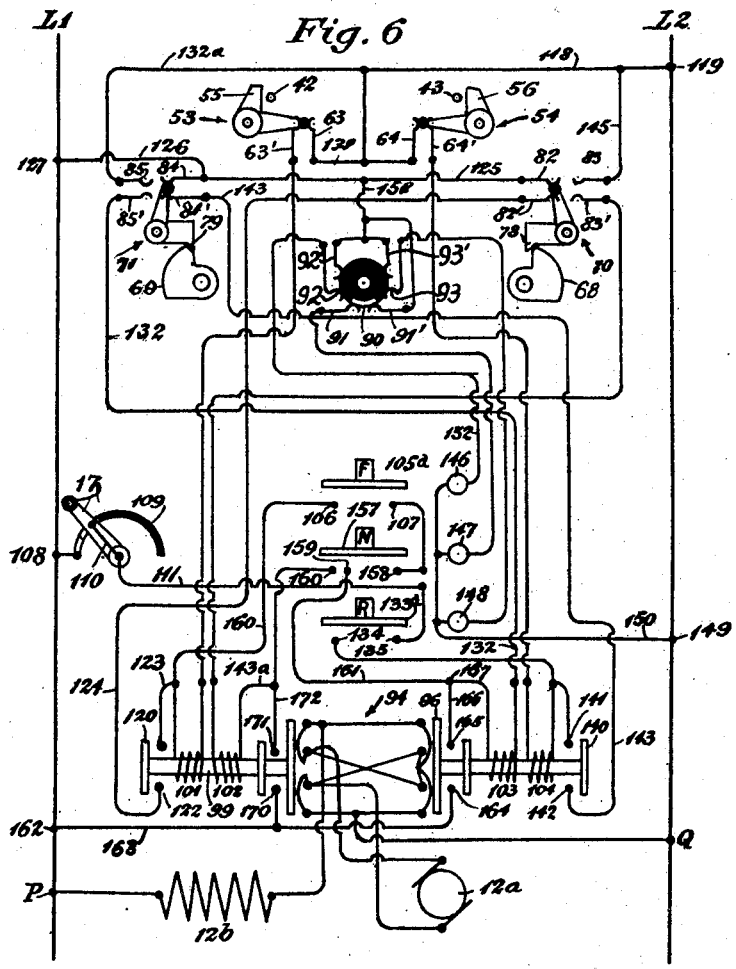
INVENTOR
Erwin J. Panish,
BY Johnson, Kline & Smyth
ATTORNEYS Patented Nov. 18, 1947

2,431,275

UNITED STATES PATENT OFFICE 2,431,275

CLUTCH CONTROL DEVICE

Erwin J. Panish, Bridgeport, Conn.

Original application August 14, 1940, Serial No. 352,499. Divided and this application December 5, 1941, Serial No. 421,824

19 Claims. (Cl. 192—.01)

1

This invention relates to power-operated means for operating clutches, such as are used in motor boats and the like for connecting the engine to a propeller shaft, and more particularly, to devices of the aforesaid type wherein an interlock between the throttle and power control means for the engine and the clutch-operating means is provided for insuring satisfactory operation of the latter.

This application is a division of my copending application Serial No. 352,499, filed August 14, 1940, now Patent No. 2,323,619, granted July 6, 1943.

Marine clutches usually are combined with reverse gears and are provided with a shaft and lever to operate the same, having forward, astern and neutral positions. Sometimes the clutch lever is mounted directly on the clutch shaft, but, in most cases, especially where the bridge or control station is remote from the engine, a system of links and levers is employed to transmit the motion from a nearby manually operated lever to the remote clutch shaft.

Heretofore it has been proposed to operate the clutch shaft pneumatically, and for this purpose, the partial vacuum created by the operation of an internal combustion engine, along with air at atmospheric pressure, has been used to operate diaphragms or pistons which in turn operate the clutch shaft. Such devices require considerable piping and suitable valves which must be maintained airtight for controlling the air pressure; and, depending as they do upon the partial vacuum created by the engine, are only operative while the engine is operating at extremely low speeds. This is very unsatisfactory. For instance, if the engine should stall while the clutch is being engaged at these low motor speeds, it would have to be restarted again while still under load. This is difficult and most times impossible. Therefore, the mechanical lever connections to the clutch would have to be removed before the clutch can be brought to a neutral position by hand, an operation which in control maneuvers of the vessel may prove to be disastrous.

The power delivered by the engine to the propeller through the clutch is ordinarily controlled at will by a throttle or like control means, the throttle being adjusted in general independently of the clutch. This permits engagement or disengagement of the clutch at any engine speed between idling and full speed setting.

If the clutch is engaged while the engine is operating at idling speed, the load on the engine may be sufficient to cause it to stall. On the other hand, if the clutch is engaged while the engine is operating at excessive speeds, danger exists that the propeller shaft may be sheared, or damage may occur to the engine or transmission. Engagement of the clutch at relatively advanced speeds also causes the vessel to lurch in the direction for which the clutch is being engaged, causing unnecessary discomfort to the passengers. Furthermore, if the clutch is disengaged while the engine is operating at advanced throttle setting, the engine will be caused to race inordinately with the possibility of resulting damage to the connecting rods, crank shaft or the like.

An object of the present invention is to provide an electric motor drive for operating a clutch to clutch and declutch two parts of a power transmitting drive, so that by merely controlling electric circuits from the bridge or other operating position, the boat or other conveyance may be caused to go ahead, may be stopped, or may be caused to go astern.

It is a further object of the invention to provide interlock means between the throttle or power control device and the said clutch control device of the present invention, whereby operation of the latter is made possible only while the engine throttle is adjusted in maneuvering speed position whereby the engine speed or power output are suitable for safe and smooth engagement or disengagement of the clutch.

The latter object is preferably accomplished by providing an electrical interlock between the throttle of the invention and the electric clutch control system so that the engine throttle must be in maneuvering speed position before the operation of the clutch control lever can be effective. This prevents either throwing the clutch in or out while the engine is operating at too low or too high a speed or power output for safe operation of the clutch.

The electric power for operating the motor of the clutch operating device may be supplied by the usual engine-starting battery, and hence is always available for the operation of the device, regardless of whether the engine is operating or not. If desired, a separate source of current may be provided, but since the electric motor employed in the device of the present invention draws considerably less current than the usual starting motor, and since the motor and the electric control means are energized only during the relatively short periods required for shifting the position of the clutch, the starter battery may advantageously be used, especially where there is no other source of electrical current available.

A feature of the present invention is the provision of means whereby the clutch operating force on the clutch is relieved automatically after the clutch has been moved to either operating position. The provision of this feature positively prevents any undue wear on the clutch mechanism, particularly the thrust collar which is employed in such clutches, and which, if constantly under load while the boat or other conveyance is in operation, would quickly wear out, and prevent further operation of the clutch.

Another feature of this invention is the provision of means whereby the clutch will be fully and safely moved to either of its operating positions without the necessity of employing mechanical limit switches for this purpose. Such mechanical limit switches would require accurate and critical adjustments when first installing the device on a clutch mechanism, and would require frequent readjustment as the clutch operating movements change due to wear on the operating parts.

With the device of the present invention, the increased load occasioned by the clutch mechanism reaching the limit of its movement automatically causes the control circuits to be opened and the motor to be rendered inoperative to further move the clutch. When installing the device on a reverse gear and clutch mechanism for a boat, it is merely necessary to fasten the device in place and connect it to the clutch shaft without taking into account the extent of arcuate movement of the clutch shaft between ahead and astern positions.

The provision of the overload responsive device, which avoids the necessity for setting limits of movement, is also advantageous in avoiding damage to the clutch mechanism, especially where the shifting to forward or reverse position involves the relative movement of gears, for should the gears be unable to mesh, or should the clutch for any reason be prevented from operating, the overload responsive device would come into operation and disconnect the electric motor from the clutch-actuating mechanism before any damage can be done to the clutch of the engine. By the same means the operating mechanism is fully protected from damage for it is impossible to stall the motor across the line at the conclusion of an operating stroke.

According to the present invention, while the movement of the clutch to its operating positions is under the control of the overload responsive mechanism, yet, in moving the clutch from either operating position to the neutral or "stop" position, increased torque (preferably, full motor torque) may be employed, in order to insure positive disengagement of the clutch at all times.

Still another feature of the present invention is the provision of means whereby the clutch may be operated by hand, in case such operation becomes necessary, without demounting any part of the clutch-operating mechanism. This is of particular advantage as compared with prior devices in which the mechanical lever connections must be removed before the clutch can be brought by hand to neutral position in case of an emergency.

In its broader aspects, the clutch control device of the present invention comprises a clutch-actuating mechanism driven by a reversible electric motor. If the clutch has but one position of engagement, the motor is adapted, by rotation in one direction, to move the clutch from neutral to engaged position, and upon reverse rotation to move the clutch from the engaged to neutral position. If the clutch is movable between a forward engaged position and a reverse engaged position through an intermediate neutral position, rotation of the motor in one direction moves the clutch from reverse engaged to forward engaged position through the neutral position, and reverse rotation of the motor moves the clutch from forward engaged through neutral to reverse engaged position.

The gearing of the clutch-actuating mechanism is so arranged that the operating force upon the clutch is positively removed after the clutch has been engaged, and the motor has ceased to operate. Moreover, the said gearing is constructed to be overhauling or non-locking. By virtue of this arrangement, the clutch-operating shaft may be operated by hand without uncoupling the operating mechanism, since the gearing of the latter does not lock the clutch in any position and the said mechanism offers only a moderate frictional resistance to such motion of the clutch-operating shaft.

In addition, a lost motion coupling is preferably provided between the gearing of the clutch-operating mechanism and the clutch-operating shaft, said lost motion being equal to or slightly greater than the operating range of said shaft. As a result, after the clutch has been operated once over its entire stroke by hand, further manual operation no longer moves the gearing of the mechanism, and the manual operation is greatly facilitated.

The said clutch-actuating mechanism includes automatic means permitting continued rotation of the motor after motion of the clutch-operating shaft is arrested, for instance after the clutch is fully engaged in either position, the said means increasing the resistance of the mechanism to further rotation of the motor to a predetermined value. Continued rotation of the motor against the said increased resistance operates torque-responsive means included in the mechanism which temporarily renders the motor inoperative to rotate further in the same direction.

Automatic means is provided to render the motor temporarily inoperative when the clutch has been moved from engaged to neutral position. The clutch-actuating mechanism is also provided with automatic means in the nature of a detent, for accurately adjusting the position of the mechanism to hold the clutch in neutral position after operation of the motor to move the clutch from engaged to neutral position has been interrupted. Such means avoids the possibility of the motor moving the clutch beyond neutral position, as a result of overtravel due to the inertia of the movable parts.

The reversible motor is operated by a motor switch which is preferably controlled by electromagnetic means. The electromagnetic means which control the switch to initiate movement of the clutch from neutral to engaged position and from engaged to neutral position is energized by control circuits including manual switches which may be remotely positioned with respect to the clutch-actuating mechanism. If desired, the manually controlled switches may be of the momentary contact type, automatic holding switches being provided to close shunt circuits which energize the electromagnetic controls to continue operation of the motor during motion of the clutch from neutral to engaged position or vice versa.

The control circuits which cause the motor to move the clutch into engaged position include torque-responsive switches which are operated by the torque-responsive means of the clutch-actuating mechanism. Continued rotation of the motor after the clutch has been engaged, causes the torque-responsive switches to open, thereby breaking the control circuit, disengaging the motor switch, and rendering the motor temporarily inoperative.

The manually operated control circuits which are adapted to cause motion of the clutch from engaged to neutral position are separate from and independent of the circuits controlled by the torque-responsive means. Thus, it is possible to apply full motor torque, if necessary, in order to initiate motion of the clutch for disengagement from either reverse or forward position.

Automatic selector switches are provided in the control circuits which cause the motor to move the clutch from engaged to neutral position. The latter switches are automatically opened by the clutch-actuating mechanism when the clutch has reached neutral position, thereby causing the motor to stop automatically when neutral position has been reached. When this occurs, the above-mentioned detent locks the clutch in neutral position and holds it there positively.

According to the invention, in order to prevent operation of the clutch when the power generated by the engine is such that damage would be caused by engagement or disengagement of the clutch or at idling speeds such that engagement of the clutch would cause the engine to stall, a switch is provided in series with the manually operated control circuits for initiating motion of the clutch, the said switch being engaged only when the engine throttle is in so called maneuvering position. Thus, when the engine throttle is in any other but the maneuvering position, the manual switches in the control circuits are ineffective to initiate motion of the clutch for engagement or disengagement.

Automatic signal means is preferably provided, operated by a portion of the clutch-actuating mechanism and adapted to indicate the position of the clutch in neutral or either engaged position, at some point remote from said clutch, preferably adjacent to the manual switches which energize the electromagnetic control circuits.

In the accompanying drawings, which show a preferred embodiment of the present invention, Figure 1 is a view of the general arrangement of the clutch control device of the present invention, assembled by way of illustration, to operate in conjunction with a marine installation, showing in side elevation, a clutch-actuating mechanism and driving motor therefor located adjacent to the clutch housing of a marine engine of the internal combustion type, a motor switch and battery adjacent to said engine, manual remote control means for the clutch control device and an engine throttle control located on the bridge of a vessel, and signalling means associated with the manual clutch control means, to indicate the position of the clutch.

Fig. 2 is a cross section of the clutch-actuating mechanism shown in Fig. 1 along the line 2—2.

Fig. 3 is a cross section of the clutch-actuating mechanism along the line 3—3 in Fig. 2.

Fig. 4 is a front elevation of the clutch-actuating mechanism shown in Fig. 1 (see arrow 4 in Fig. 2) with the cover plate removed, to show the cams, levers, and control switches.

Fig. 5 is a schematic view of the automatic control switches shown in Fig. 4, and of the motor, motor switches, and the manual clutch and throttle control means shown in Fig. 1, including a wiring diagram showing the electric control and power circuits.

Fig. 6 is similar to Fig. 5, but shows a variation of the manual clutch control means, whereby push button control is substituted for the manual lever control shown in Fig. 5.

Fig. 7 is a rear view of the clutch-actuating mechanism shown in Figs. 1, 3 and 4 (see arrow 7 in Fig. 2) showing detent means for accurately positioning and retaining the clutch in neutral position.

Figure 1:
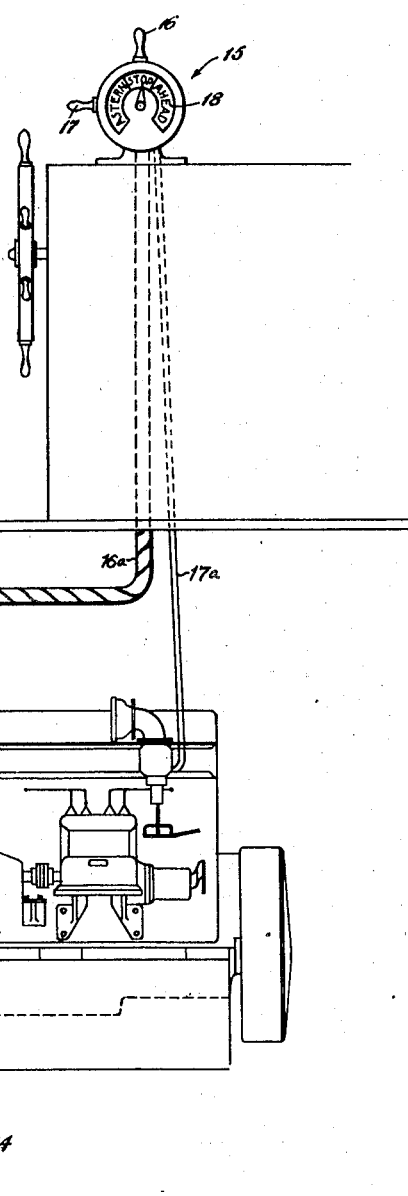

According to the present invention, the clutch-control device, shown in Fig. 1, comprises a clutch-actuating mechanism 10 positioned adjacent the clutch housing of a prime mover, shown for purposes of illustration as an internal combustion engine 11, an electric motor 12 for driving said clutch-actuating mechanism, a motor switch box 13, an electric battery 14 serving as the source of power for the motor, and a manual control device 15 including a clutch control lever 16 connected to the engine room by cable 16a, a throttle control lever 17 connected to the throttle by connector 17a and an indicating dial 18 which shows the positions of the clutch for "stop," "ahead," and "astern." The dial 18 may be of transparent or translucent material, behind which electric lights are positioned which illuminate a segment of the dial corresponding to the position in which the clutch is positioned.

The location of the clutch-operating shaft which is driven by the clutch-actuating mechanism 10 is shown in dotted lines 19 within the outline of said clutch-actuating mechanism. Electrical connections are shown whereby the battery, motor switches, motor, and clutch-actuating mechanism may be controlled by means of the manual remote control device 15. The arrangement of the clutch control device is shown by way of illustration for use in a marine installation. It is understood that the said device may be used in any installation comprising a movably operated clutch and a prime mover.

The clutch-actuating mechanism 10 shown in Figs. 2, 3 and 4 engages a clutch control shaft 19 which is capable, by rotation through a limited angle, to move the clutch from reverse engaged position through an intermediate neutral position to forward engaged position, or vice versa.

The clutch-actuating mechanism comprises a casing 20, including a housing 21, a cover and bearing plate 22, and an outer cover plate 23 held together by bolts 24. The housing 21 is provided with an extension 25, whereby it may be affixed to a portion of the engine frame 26.

The main operating shaft 28 of the clutch-actuating mechanism is journaled in bearings carried by the housing 21 and bearing plate 22, and extends through said bearings at both ends. The end of said shaft protruding through the housing 21, carries a coupling 27, keyed to said shaft and adapted by means of protruding fingers 27a to engage a corresponding coupling on the end of the clutch-operating shaft 19. If desired, a flexible coupling member may be interposed between the ends of shafts 19 and 28 whereby exact alignment of the clutch control shaft 19, and the main operating shaft 28, is rendered unnecessary. The main operating shaft 28 is provided with a gear 29 driven by a pinion 30. The gear 29 may be keyed to the shaft 28, but preferably a lost motion device is interposed between said gear and shaft. For example, the said gear is constructed to rotate freely on the said shaft, an antifriction bushing being provided therebetween as shown. A pair of lateral projections 29a protruding from the face of the gear are adapted to engage a corresponding pair of radial wings 28a on a sleeve 28b which is keyed to the shaft 28. The said wings 28a and projections 29a are constructed of such size that the shaft 28 can rotate through an angle equal to or somewhat greater than the limited angle corresponding to the operating range of the clutch-operating shaft 19. Thus, when the gear 29 is so positioned that projections 29a occupy positions corresponding to or including the limits of motion of the wings 28a, the shafts 19 and 28 can be rotated by externally applied force without moving the gearing of the clutch-actuating mechanism. Consequently, in case of emergency, the clutch may be readily operated by hand without demounting or uncoupling any part of the mechanism, for instance, by means of a radial handle H, indicated in dotted lines in Fig. 1, secured to the shaft 19, or by means of any suitable crank engaging the shaft 19 or 28.

The pinion 30 which drives gear 29 is keyed to a worm wheel 31, and both are adapted to rotate freely on the worm wheel shaft 32 which is supported above the operating shaft 28 by the housing 21 and bearing plate 22.

The worm wheel 31 is driven by a worm 33 which is mounted in such a manner as to be axially slidable on a worm shaft 34. The worm shaft is provided with splines 35 parallel to its axis which engage corresponding grooves in the worm, whereby the said worm rotates with the shaft, but is free to slide axially thereon. One end of the worm shaft is squared as shown at 34' and is engaged by a correspondingly shaped opening at the end of the sleeved motor shaft 36. The casing 37 of the motor 12, part of which is shown in Fig. 3, is bolted to the housing 21. The squared end of shaft 34 and the motor 12, coupled therewith, may be at either end of the mechanism 10. In Fig. 1, it is shown at the left, while in Figs. 3, 4, and 7, it is at the right.

Longitudinal displacement of the worm 33 on the worm shaft 34 is normally opposed by sliding collars 38 and 39 which are held in guides and shouldered in the housing 21.

Thrust bearings 40 and 41 separate the collars 38 and 39 from the ends of the worm 33 permitting said worm to rotate freely without corresponding rotation of the said collars. The collars 38 and 39 are prevented from rotating by pins 42 and 43 which project radially therefrom through elongated openings 44 in the cover plate 22. The openings 44 are elongated to permit the pins 42 and 43 to be laterally displaced when the sliding collars 38 and 39 are moved parallel to the axis of the worm shaft 34 in the guides provided in the housing 21.

Springs 45 and 46, supported by spring cups 47 and 48 which are shouldered against the outer races of the worm shaft bearings 49 and 50 urge the sliding collars 38 and 39 against the thrust bearings 40 and 41 and normally prevent axial displacement of the worm 33 on the worm shaft 34.

The worm shaft 34 is held in position by means of the bearings 49 and 50, the outer races of which support the spring cups 47 and 48 and are respectively locked in the housing 21 by adapter 50a and cover plate 49a. The inner races of the bearings 49 and 50 are secured by means of nuts 51 and 52 to the worm shaft 34.

It will be observed that motion of the gear train is limited, since angular motion of the clutch control shaft 19, and, consequently, of the worm operating shaft 28, is limited by engagement of the clutch in either engaged position.

The motor 12 is reversible and is adapted to drive the worm 33 in either direction; thus when the motor rotates in one direction or the other, it is adapted to move the clutch control shaft 19 to one or the other limit of its angular motion by means of the gear train including the worm wheel 31, gears 29 and 30, sleeve 28b, and the main operating shaft 28.

During normal operation between limiting positions, the springs 45 and 46 prevent axial displacement of the worm 33 on the shaft 34 by exerting pressure against the sliding collars 38 and 39. Referring to Figs. 2 and 3, when the motor drives the worm 33 counterclockwise, the operating shaft 28 is caused to rotate clockwise until the clutch is engaged, whereupon further rotation of the shaft 28 is arrested. Continued rotation of the motor in the same direction causes the worm to screw through the worm wheel to the right applying pressure through the thrust bearing 40 to the sliding collar 38, displacing the latter, and moving pin 42 sideways, in the elongated opening 44. The spring 45 is thereby compressed requiring application of torque of a predetermined increased value by the motor to the worm shaft. The said motion of the pin 42 is adapted to render the motor temporarily inoperative as hereinafter more fully explained.

After operation of the motor has ceased, the compressed spring 45 urges the worm 33 and collar 38 back into their normal positions upon the shaft 34 by exerting pressure upon said sliding collar. To this end, the helix angle of the worm 33 is so constructed as to render the worm overhauling or nonlocking, whereby it is adapted to screw back through the teeth of the worm wheel 31 under the influence of said spring without moving said worm wheel, returning to its normal position upon the shaft 34. By virtue of the fact that the worm is nonlocking or overhauling, operating pressure is removed from the gear train after engagement of the clutch, and, consequently, any pressure on the thrust collar of the clutch is impossible.

Furthermore, the nonlocking feature enables an operator to carry out the initial hand operation of the clutch as hereinbefore described, in case of failure of any part of the clutch-actuating device, since after motor operation thereof, the lost motion device, above described, is not positioned to permit operation of the shafts 28 and 19 independently of the gearing. However, after one complete hand operation, subsequent manual operation is independent of said gearing.

Referring again to Figs. 2 and 3, if the worm 33 is driven clockwise by the motor shaft 34, the clutch-operating shaft 19 is rotated counterclockwise until it reaches the limit of its angular rotation. Continued rotation of the motor then causes the worm 33 to screw to the left through the worm wheel 31 displacing the sliding collar 39 and compressing the spring 46. As before, compression of said spring increases the torque load upon the motor to a predetermined value. The radial pin 43 which protrudes from the sliding collar 39, is moved to the left in the elongated opening 45. Displacement of the pin 43 is adapted to render the motor temporarily inoperative, as hereinafter more fully explained.

When operation of the motor ceases, the spring 46 urges the worm 33 back into its normal position upon the shaft 34 by exerting pressure against the sliding collar 39 and the thrust bearing 41. As before, the worm 33 screws backward through the worm wheel 31 until it has returned to its normal position on the shaft.

Referring to Fig. 4, the bearing plate 22 is provided with a pair of torque switches 53 and 54, comprising operating levers 55 and 56 and switch arms 57 and 58 integral therewith, pivoted at points 59 and 60. Contacts 61 and 62 are provided at the ends of the switch arms, adapted to form electric contact respectively between contact fingers 63 and 63' and between fingers 64 and 64'. Motion of the torque switches 53 and 54 is limited by means of lugs 65 and 66 protruding from the cover plate 22, and engaging the operating arms 57 and 58 thereof, respectively. The switches are normally urged into engagement by means of a spring 67 joining the operating levers 55 and 56. The pins 42 and 43 carried by the sliding collars 38 and 39 are adapted upon lateral displacement in elongated openings 44 and 44' to engage the operating arms 55 and 56 respectively of switches 53 and 54, and cause the latter to break contact between fingers 63, 63' and 64, 64'.

As shown in Fig. 2, the end of the operating shaft 29 projects through the bearing plate 22. A pair of cams 68 and 69 are adjustably mounted upon the protruding end of the operating shaft 28, and are adapted to operate automatic stop switches 70 and 71. As indicated in Fig. 2, the cams 68 and 69 are arranged in different planes whereby they are adapted to actuate the switches 70 and 71 separately.

The selector or stop switches 70 and 71 comprise operating arms 72 and 73 and contact arms 74 and 75, rigidly secured thereto, pivoted at 76 and 77. The operating arms 72 and 73 are provided with projections 78 and 79 which are engaged by cams 68 and 69 respectively. The contact arms 74 and 75 are provided with contacts 80 and 81. The contact 80 is adapted alternately to form electric contact between contact fingers 82 and 82' or fingers 83 and 83'; and contact 81 is similarly adapted to form contacts either between the fingers 84 and 84', or fingers 85 and 85'. Pivotal motion of the switches 70 and 71 about the pivots 76 and 77 is limited by the projecting lugs 86 and 87 provided on the bearing plate 22. When the said switches are not engaged by the cams 68 and 69, they are normally urged to form contacts respectively between the fingers 82 and 82', and fingers 84 and 84', by means of a spring 88 joining the free ends of operating arms 74 and 75.

The cams 68 and 69 are rigidly adjusted upon the end of the operating shaft 28 in the positions shown in Fig. 4, to release both stop switches 70 and 71 when the clutch is in intermediate neutral position. Upon rotation of the operating shafts 19 and 28 in clockwise direction to move the clutch to one engaged position, cam 69 raises the operating arm 73 of switch 71 by engaging projection 79, moving contactor 81 out of contact with fingers 84, 84' and into contact with fingers 85, 85'. Meanwhile, switch 70 is not engaged by cam 69, since it is disposed in a different plane as hereinbefore stated. As hereinafter explained, contact between the fingers 85 and 85' establishes a circuit whereby the motor may be subsequently energized to move the operating shafts 19 and 28, and the cams 68 and 69, in counterclockwise direction to return the clutch to neutral position. When the motor is thus energized, cam 69 rotates counterclockwise, releasing the switch arm 73 when the clutch reaches neutral position. The spring 88 then urges the switch 71 to the right, breaking contact between fingers 85 and 85' and reestablishing contact between the fingers 84 and 84'. Operation of the motor is thereby interrupted, and the clutch remains in neutral position.

When the clutch is moved to the other engaged position by counterclockwise rotation of the operating shafts 19 and 28, cam 68 is moved counterclockwise, engaging the projection 78 on the operating arm 74 of the switch 70, and causing the contact 80 to break the contact between the fingers 82 and 82', and form contact between the fingers 83 and 83'. The latter contact establishes a circuit adapted to energize the motor to rotate the operating shafts 19 and 28 and the cam 68 in clockwise direction in order to return the clutch to neutral position. When thus energized, the motor rotates the said clutch operating shaft and cam 68 clockwise until the clutch reaches neutral position. Cam 68 releases switch 70, interrupting contact between the fingers 83 and 83' and rendering the motor temporarily inoperative to move the clutch further. Thus the clutch is halted in neutral position.

Means is preferably provided for accurately positioning and retaining the clutch in neutral position after operation of the motor to move the clutch to said position has ceased. The provision of means for this purpose is especially advantageous in order to prevent overtravel of the clutch-actuating mechanism due to inertia of the moving parts when the clutch is moved to neutral position. Such means is shown, for instance, in Figs. 2 and 7, comprising a pair of cams 173 and 174 which may be conveniently constructed integral with coupling 27 on the end of the operating shaft 28. The cam surfaces 173a and 174a engage a cam follower 175 carried by a stud 176, whereby said cam follower is attached to a lever 177 intermediate the ends thereof. The said lever is supported at one end by a pivot 178 at one side of the housing 21, and its free end 177a is joined by a tension spring 179 to a boss 180 carried at the lower part of said housing at the opposite side. The spring 179 urges the cam follower 175 against the cam surfaces, which are arcuate with respect to the axis of the operating shaft 28. At their adjacent corners, cams 173 and 174 are cut away as shown at 173b and 174b forming a V-shaped notch or indentation.

The cams are adjusted on the shaft 28 so that the cam follower 175 carried by stud 176 is positioned in the V-shaped notch when the clutch is accurately held in neutral position. In order to move the clutch away from neutral position, the cam follower 175, and lever 177 are raised by overcoming the opposing tension of spring 179 until said cam follower is supported on one of the cam surfaces 173a or 174a. Thus the device constitutes a detent to position and retain the clutch in neutral position.

In order to facilitate accurate adjustment of the detent, pivot 178 is provided with an eccentric plate 181 which may be secured in any desired position. Thus by adjusting said eccentric, the lever 177 may be shifted longitudinally, displacing the cam follower 175 to the right or left to obtain the desired adjustment of the detent for neutral position of the clutch.

Signal means is preferably provided to indicate the position of the clutch in either engaged position, and in neutral position. This means comprises, for instance, a disk of dielectric material 89, shown in Fig. 4 (but omitted in Fig. 2), which is rigidly secured to the projecting end of operating shaft 28. The said disk is provided with a conducting segment 90, which is adapted to form electric contact successively between pairs of contactors 91, 91', 92, 92', and 93, 93'. The disk 89, is adjusted in such a manner that the segment 90 forms contact between contactors 91, 91' when the clutch is in neutral position as shown in Fig. 4 and between the pairs of contactors 92, 92' and 93, 93', respectively, when the clutch is moved into one or the other of its engaged positions, upon counterclockwise or clockwise rotation of the disk 89 with the operating shaft 28 and clutch control shaft 19 to either limit of their angular motion. The contacts thereby established successively close the circuits of three electric signal lamps which are preferably located as hereinbefore indicated adjacent the dial 18 of the manual control device 15, illuminating segments of said dial successively to show the position of the clutch.

The automatic switches which are operated by the clutch-actuating mechanism, and the manually operated remote clutch control and throttle control means are shown in Fig. 5, with a wiring diagram to illustrate the control circuits whereby operation of the motor switch is controlled. For convenience, those portions of the mechanism which operate in conjunction with forward engagement of the clutch are shown to the left of the said diagram and those which control reverse engagement of the clutch are shown to the right.

The motor 12 is of the series wound type, comprising an armature 12a and a field 12b connected to the power lines L1 and L2 at P and Q respectively. By provision of a series-wound motor of the type shown, relatively high initial starting torque is assured.

A reversing motor switch 94 is interposed in the motor circuit. It comprises contactor 95 adapted to close the circuit between the contact points 97 for forward operation of the motor, and contactor 96 adapted to form contact between the contact points 98 for reverse operation. The contactors 95 and 96 are mechanically interlocked so that only one of these may be brought into engagement with the corresponding contact points at a time. The said contactors are normally held out of engagement by suitable mechanical means.

Electromagnetic means are provided comprising armature 99, attached to contactor 95, and cooperating with magnet coils 101 and 102, and armature 100 attached to contactor 96, and cooperating with magnet coils 103 and 104 for the purpose of engaging the motor switch.

Either of the two magnet coils 101 or 102 is adapted, upon energization, to engage contactor 95 with contact points 97, and similarly, either of the magnet coils 103 or 104 is adapted to engage contactor 96 with the contact points 98.

In Fig. 5 all of the mechanical and electrical parts are shown in the positions which they occupy when the clutch is in neutral, and the engine throttle set in maneuvering position. In order to move the clutch to forward engaged position, control lever 16 is moved to the left to F until it depresses momentary contact 105, forming a connection between the contact points 106 and 107. According to the invention, a circuit is thereby set up momentarily from the line L1 at the junction 108, to segment 109. The latter is engaged by an electric conductor 110 contained within the throttle control lever 17. From conductor 110, the circuit traverses lead 111 to the junction point 112, then lead 113 to contact 107, through contactor 105 to contact 106, through lead 114 to the magnet coil 101, through lead 115 to switch 53 and through leads 116, 117 and 118 to the line L2 at the junction 119. Upon energization, the magnet coil 101 moves contactor 95 into engagement with contact points 97 and the motor rotates in forward direction, initiating motion of the clutch from neutral position to forward engaged position.

At the same time, contactor 120, also operated by the armature 99, is moved into engagement with contact points 121 and 122, thereby closing a shunt or holding circuit from the magnet coil 101 to the line L1, including leads 123 and 124, automatic switch 70 and leads 125 and 126 to the line L1 at junction 127. The control lever 16, after depressing the momentary contactor 105, moves back automatically to the position indicated by the dotted line X, thereby breaking the circuit from the line L1 at the junction 108 through the throttle control lever 17 to the magnet coil 101. Energization of the said magnet coil, however, is maintained through the aforesaid shunt circuit, set up by the contactor 120, which remains engaged with the contact points 97.

When the clutch is moved into forward engaged position, continued rotation of the motor 12a causes the worm 33 to screw through the worm wheel 31, displacing the slidable collar 38, and moving the pin 42 into engagement with the arm 55 of the torque switch 53, moving said arm to the left. This causes contact 61 on the switch arm 57 of said torque switch to move out of engagement with contact fingers 63 and 63', thereby breaking the circuit from the magnet coil 101 to the line L2. The armature 99 which is thereby released, moves contactor 95 and contactor 120 out of engagement with their respective contact points, and thus interrupts operation of the motor.

The spring 45 then urges the collar 38 and the worm 33 to their original positions on the worm shaft, since the worm is overhauling, and torque switch 53 reestablishes contact between the fingers 63 and 63'. However, since the holding circuit contactor 120 has already broken the circuit to magnet coil 101, and since the momentary contact switch 105 is no longer engaged with its contact points, no further operation of the motor takes place.

Meanwhile, motion of the clutch-operating shaft 19, and the main operating shaft 28 from neutral to forward engaged position has caused rotation of the cam 68 in clockwise direction, as indicated by arrow F', engaging projection 79 on the arm 73 of the automatic switch 71, and causing contact 81 to break contact between the fingers 84 and 84' and to establish contact between the fingers 85 and 85'. Simultaneous motion of cam 68 in clockwise direction has no effect upon the automatic switch 70.

If it is now desired to move the clutch from forward engaged position F to neutral position N, the clutch control lever 16 is moved from position X to the vertical position as shown in Fig. 5. A circuit is thereby set up from the line L1 at the junction 108 through the segment 109, the throttle control connection 110, lead 111, conductor 128 in the clutch control handle 16 to contact 129, through leads 130 and 131 to the magnet coil 103, thence through lead 132 to the contact finger 85', contact 81, and contact finger 85 of the automatic switch 71, and thence through leads 132a and 118 to the line L2 at 119. Upon energization of magnet coil 103, armature 100 moves contactor 96 into engagement with contact points 98 and causes the motor to rotate in reverse direction. The clutch is thereby moved from forward engaged position to neutral position. Since the torque switches 53 and 54 are not included in the circuit of magnet coil 103 and are thus inoperative to prevent its energization, full starting torque of the motor is available if necessary to initiate the motion of the clutch.

As the clutch moves to neutral position, cam 69 moves counterclockwise until it no longer engages the automatic switch 71. Contact 81 is thereby moved out of engagement with fingers 85 and 85' and into engagement with contact fingers 84 and 84'. The circuit through the magnet coil 103 is thereby broken. The motor switch contactor 96 moves out of engagement with its contact points and operation of the motor ceases. The cam follower 175 of the detent mechanism shown in Figs. 2 and 7 engages the V-shaped notch formed by the cams 173 and 174, and adjusts the clutch accurately in neutral position.

Operation of the device for moving the clutch to and from reverse engaged position R is similar. When the clutch control lever 16 is moved to the right, momentary contactor 133 is depressed establishing a connection between contact points 134 and 135. A circuit is thus set up from the line L1 at 108 through segment 109, conductor 110 of the throttle control lever 17, lead 111 to junction 112, through lead 136 to momentary contact switch 134, 133 and 135, through lead 137 to magnet coil 104, through lead 138 to the torque switch 54, and through leads 139, 117 and 118 to the line L2 at 119.

Magnet coil 104 is thereby energized causing the armature 100 to move contactor 96 into engagement with contact points 98 and initiating reverse rotation on the motor. At the same time, holding contactor 140 is moved by the armature 100 into engagement with contact points 141 and 142, closing a shunt or holding circuit from the line L1 through the junction 127, lead 126, contact finger 84, contact 81, contact finger 84' and lead 143 to the magnet coil 104. Thus, as long as the motor switch contactor 96 is engaged with its contact points, said magnet coil 104 is energized through the said shunt circuit, while control lever 16 moves back automatically to the position denoted by dotted line S, releasing momentary contactor 133 from contact points 134 and 135.

However, when the clutch has reached reverse engaged position, motion of worm wheel 31 is arrested, and continued rotation of the motor causes the worm 33 to screw through the worm wheel 31, displacing collar 39 against the pressure of the spring 46, and displacing the pin 43 to engage the arm 56 of the torque switch 54 to the right. This lifts contact 62, breaking the electric contact between the fingers 64 and 64'. Thus, the circuit through the magnet coil 104 is broken, and the armature 100 moves to its original position, interrupting contact between the contactor 96 and its corresponding contact points, and disengaging holding contactor 140 from the points 141 and 142. Further reverse rotation of the motor is thus prevented.

The spring 46 urges the collar 39 and worm 33 to their original positions on the shaft 34, and pin 43 moves out of engagement with the torque switch 54, allowing the contact 62 to reestablish contact between fingers 64 and 64'. However, since the holding contactor 140 is no longer engaged with the contact points 141 and 142, and since the clutch control lever 16 has moved back automatically to the position shown by the dotted lines S, releasing the contactor 133 from engagement with the points 134 and 135, the magnet coil 104 is not reenergized.

Motion of the clutch control mechanism to move the clutch to reverse engaged position causes the cam 68 to rotate counterclockwise, as indicated by arrow R' engaging projection 78 on the arm 72 of the automatic switch 70, bringing contact 80 out of engagement with fingers 82 and 82' and into engagement with fingers 83 and 83'. Rotation of cam 69 in counterclockwise direction has no effect upon automatic stop switch 71.

When it is desired to return the clutch to neutral position, the clutch control handle 16 is moved to the vertical position shown in Fig. 5. A circuit is thereby established from the line L1 at junction 108 through segment 109, throttle control handle 110, lead 111, to junction 112, through clutch control handle 128, to contact 129, through leads 130 and 143 to the magnet coil 102 and back to the line L2 through lead 144, contact fingers 83 and 83' and leads 145 and 118. The resulting energization of solenoid 102 causes armature 99 to move contactor 95 into engagement with contact points 97, thereby causing the motor to rotate in forward direction, and move the clutch from reverse engaged position S to neutral position N. Since neither of the torque-responsive switches 53 nor 54 is included in the circuit, full motor torque may be applied, if necessary, to disengage the clutch. When the clutch reaches neutral position, cam 68 has moved in clockwise direction until it no longer engages the projection 78 on arm 72 of the automatic switch 70. The said switch returns to its original position breaking contact between fingers 83 and 83', and thereby interrupts the circuit from the magnet coil 102 to the line L2. Operation of the motor is thereby interrupted and the clutch remains in neutral position.

According to the present invention, means are provided to render the control circuits through the magnet coils 101, 102, 103 and 104 inoperative when the engine throttle is in relatively advanced position or in idling position. This so-called throttle interlock prevents disengagement or engagement of the clutch when the power generated by the engine or prime mover, is sufficiently great to cause damage upon engagement or disengagement of the clutch, or when the engine speed is so low that engagement of the clutch would stall the engine.

Referring to Fig. 5, the said throttle interlock comprises the segment 109 which is adapted to form contact with the electrical conductor 110 in the handle of the throttle control lever 17, only when said control lever is in a position to cause the engine to operate at reduced power, but greater than at idling speeds. This range of throttle adjustment corresponds to so-called maneuvering speeds of the engine. Thus, referring to Fig. 5, when the lever is moved to the right, that is, to advanced position, or when it is moved to the extreme left, that is, to idling position, contact between the segment 109 and the electrical connection 110 is interrupted and the motor switch control circuits through lead 111 to the junction 112, which are operated by the clutch control lever 16, are broken. Hence, when the throttle is in advanced position, or in idling position, motion of the clutch control lever 16 is inoperative to energize any of the magnet coils controlling the motor switch, and is thus incapable of initiating motion of the clutch in any direction.

Provision of the so-called throttle interlock prevents the possibility of inordinately racing the engine by sudden disengagement of the clutch when the engine is operating under load at an advanced power rate, thus avoiding, for instance, the possibility of breaking a piston rod as a result of such sudden disengagement. Furthermore, if the operator inadvertently advances the throttle when the clutch is disengaged, and causes the engine to race, engagement of the clutch whereby the propeller shaft may be sheared or other damage caused, is prevented. The throttle interlock also prevents the operator from causing the boat to lurch by inadvertent engagement of the clutch when the engine is racing. Similarly, the said throttle interlock prevents stalling the engine by engaging the clutch while the engine is operating at idling speeds.

The said throttle interlock also provides the possibility of carrying out a novel maneuver in operating a boat. When the boat is proceeding under power with the throttle advanced, the pilot may set the clutch control lever in "stop" or neutral position without disengagement of the clutch, since the throttle interlock renders the clutch control lever inoperative to energize the control circuits of the motor switches. As the boat approaches a place where it is desired to stop, the throttle lever is gradually moved to reduced setting. As soon as the throttle control lever establishes electrical contact whereby the control circuits are energized, the clutch is automatically disengaged without further operation of the clutch control lever. Thus, the stopping of the boat may be effected by motion of only one control lever, which is of material advantage in emergencies; and in order to permit more convenient and more accurate control for stopping the boat.

A separate circuit is preferably provided to operate signal means showing the position of the clutch in either engaged position or in neutral position. Such signal means is shown in Fig. 5 comprising, for example, three electric lights, 146, 147 and 148. The circuit for operating the said signal means is joined to the line L2 at the junction 149 by lead 150 terminating at junction 153. The latter is connected to each of the three lamps, the circuit of lamp 146 comprising leads 151 and 152 and terminating at finger 93; the circuit for lamp 148 comprising lead 154 and terminating at contact finger 92; and the circuit for lamp 147 comprising leads 155 and 156 and terminating at contact finger 91. The circuit from the line L1 is permanently established from the junction 127 through leads 126, 157 and 158, to the corresponding contact fingers 91', 92' and 93'. Contact segment 90 which rotates with the operating shaft 28 of the clutch-actuating mechanism is adapted to form contact successively between the fingers 92 and 92', 91 and 91', and 93 and 93'. As shown in Fig. 5, with the clutch in neutral position, the segment 90 establishes a circuit through fingers 91 and 91', causing the lamp 147 to be illuminated, indicating that the clutch is in neutral position. Correspondingly, when the clutch-actuating mechanism moves the clutch to forward engaged position, the contact 90 is moved clockwise engaging fingers 93 and 93' and illuminating lamp 146. Similarly, when the clutch-actuating mechanism moves the clutch to reverse engaged position, the segment 90 is moved into contact with fingers 92 and 92', illuminating the lamp 148, to indicate the position of the clutch in reverse engagement.

If it is desired to move the clutch from forward engaged position directly to reverse engaged position, the clutch control lever 16 is moved to the right from the position shown in Fig. 5, designated as X, until contactor 133 is depressed, forming contact between points 134 and 135. The lever is held in this position until the clutch has reached neutral position as indicated by illumination of the lamp 147. Thereafter, the handle may be released permitting the contactor 133 to be disengaged from points 134 and 135.

By depressing contactor 133, a circuit is set up through the magnet coil 104 causing armature 100 to move motor switch contactor 96 into engagement with its contact points, causing the motor to rotate in reverse direction, and moving the clutch out of forward engaged position toward neutral position. It is necessary to hold the lever 16 in such a position that momentary contactor 133 is continuously depressed until the clutch has reached neutral position, as indicated by signal lamp 147, since the holding circuit which would normally maintain energization of the magnet coil when the motor switch contactor 96 is engaged is rendered inoperative during motion of the clutch from forward engaged to neutral position by the cam 69 which holds automatic stop or selector switch 71 in such a position that contact 81 is disengaged from fingers 84 and 84'. However, when the clutch reaches neutral position, cam 69 has rotated counterclockwise, releasing projection 79 of automatic switch 71 and allowing contactor 81 to reestablish contact with fingers 84 and 84' thereby rendering the aforesaid holding circuit effective to maintain the motor switch contactor 96 in engagement with its contact points, and continue operation of the motor to move the clutch from neutral to reverse engaged position. When the clutch reaches reverse engaged position, torque switch 54 interrupts the circuit of magnet coil 104 as hereinbefore described.

Operation of the clutch from reverse directly to forward engaged position is similar. Clutch control lever 16 is moved to the left and held down so that momentary contactor 105 maintains contact with points 106 and 107 until the clutch has passed through neutral position, as indicated by illumination of lamp 147. This maintains the circuit energizing the magnet coil 101 which holds contactor 95 in engagement with contact point 97 and causes the motor to rotate in forward direction, moving the clutch from reverse to neutral position. After the clutch reaches neutral position, the control lever 16 and contactor 105 may be released, since cam 68 has moved clockwise releasing projection 78 of automatic switch 70, allowing the contact 80 to engage fingers 82 and 82', thus establishing the holding circuit whereby the magnet coil 101 is energized to maintain motor switch contactor 95 in engagement, and continue motion of the clutch to forward engaged position. The torque-responsive switch 53 operates as herein described, to stop the motor after the clutch has reached forward engaged position.

Fig. 6 illustrates a variation of the arrangement shown in Fig. 5, whereby push button control means is substituted for the manual clutch control lever 16, shown in Figs. 1 and 5. The momentary contactors 105a and 133a and the circuits controlled thereby which initiate and maintain motion of the clutch from neutral to either engaged position are similar in their operation to contactors 105 and 133 and the corresponding circuits shown in Fig. 5, but the said contactors are constructed in the form of push buttons.

In order to initiate motion of the clutch from either engaged position to neutral position $n$, a push button contactor 157 adapted to form momentary contact between the contact points 158, 159 and 160 is substituted for the contact 129 and the electrical conductor 128 in the clutch control lever 16, shown in Fig. 5.

When the clutch is in forward engaged position and it is desired to move it to neutral position, contactor 157 is momentarily depressed, establishing a circuit from the line L1 at 108 through the segment 109, throttle control connector 110, lead 111 to junction 112, to contact point 158, contactor 157, and contact point 159, through leads 161 and 131 to magnet coil 103, and thence to the line L2 as in Fig. 5.

The magnet coil 103 operates motor switch contactor 96 engaging it with contact points 98 as in Fig. 5. In order to maintain energization of magnet coil 103 during motion of the clutch from forward engaged to neutral position, a shunt or holding circuit is provided from the line L1 at 162 through lead 163 to contact point 164, through contactor 165, contact point 166, and leads 167 and 161 to the magnet coil 103. Contactor 165 is operated by the armature 100, being moved into contact with points 164 and 166, upon engagement of the motor switch contact 96 with its corresponding contact points 98, and maintaining the circuit through the magnet coil 103, after push button contactor 157 has been released.

When the clutch reaches neutral position, cam 69 which moves counterclockwise causes the automatic switch 71 to break the circuit through the magnet coil 103, disengaging the motor switch contactor 96 and shunt or holding contactor 165 from their respective contact points, and thus causing the motor to stop when the clutch has reached neutral position. Operation of the detent mechanism as hereinbefore described, accurately positions and retains the clutch in neutral.

A similar arrangement is provided in order to allow contactor 157 to cause the clutch to be moved from reverse engaged position to neutral position. In this case, momentary contact is set up from the line L1 at 108 through the throttle control contacts 109 and 110, lead 111, and junction 112 to contact 158, contactor 157 and contact 160 through lead 168 to magnet coil 102, and thence to the line L2 as described with reference to Fig. 5. Energization of the magnet coil 102 causes the armature 99 to move motor switch contactor 95 into engagement with contact point 97 and holding contactor 169 into engagement with contact points 170 and 171. Rotation of the motor to move the clutch from reverse engaged position to neutral position is thereby initiated. In order to maintain the motor switch contactor 95 in engagement with its contact point after the push button 157 has been released, a shunt circuit is provided from the line L1 at 162 through lead 163 to contact point 170, through holding contactor 169 to contract point 171 and through leads 172 and 143 to the magnet coil 102.

As described with reference to Fig. 5, when the clutch reaches neutral position, automatic stop switch 70 breaks contact between fingers 83 and 83' as cam 68 releases the projection 78 of switch, deenergizing the magnet coil 102, and disengaging the motor switch 94 and holding contactor 169.

In order to permit a similar maneuver in the case of the device shown in Fig. 6, as hereinbefore described with reference to Fig. 5, whereby the manual clutch control may be set for "stop" position when the boat is operating under relatively advanced power, and disengagement of the clutch is effected merely by moving the throttle control lever to reduced position, means may be provided to hold the push button 157 in depressed position. By virtue of the throttle interlock, the throttle control lever may then be employed as the sole means for stopping the boat, as hereinbefore described.

It will be seen that depression of the contactor 157 automatically selects the magnet coil to be energized, that is magnet coil 102 or 103, depending upon the position of the clutch, in forward or reverse engaged position, since cam 68 or 69 has interrupted one of the two circuits to contact points 159 and 160, depending upon the position of the clutch.

The device shown in Fig. 6 is characterized by the same advantages as those characterizing the device of Fig. 5.

It will be noted from the foregoing description of the circuits of Figs. 5 and 6 that the segment 109 and the cooperating conductor 110 in the handle of throttle control lever 17 are included only in the control circuit from the line L1 to the manual control switches operated by the lever 12 or the push button contactors 105, 133 and 157, while the power circuit for the motor is independently connected to the line L1 at P, and the holding circuits for maintaining the motor switches engaged, and the signal lamp circuits are independently connected to the line L1 at junction 127.

Accordingly, movement of the throttle control lever 17 beyond maneuvering range and consequent opening of the interlock switch operated thereby during a desired clutch operation which was initiated in response to closing of the appropriate manual control switch of the clutch control lever 12 while the throttle was adjusted for maneuvering speed does not interrupt the said clutch operation, since the power circuit for the motor and the holding circuits for the motor switch relays which remain operative regardless of the position of the throttle interlock switch will automatically effect completion thereof.

Variations and modifications may be made within the scope of this invention and portions of the improvements may be used without others.

I claim:
1. In combination with a prime mover having adjustable power control means and a clutch for transmitting the power generated thereby, an overhauling or nonlocking actuating mechanism for operating the clutch; power-operated means for driving said actuating mechanism; and automatic means rendering said driving means operative only as long as the power control means of the prime mover is adjusted within a predetermined range, said power control means being adjustable over its entire range independently of the condition of the clutch, and said clutch being manually operable without uncoupling it from said actuating mechanism, including the driving means therefor, by virtue of the nonlocking character of the actuating mechanism, said power control means remaining operative to adjust the power output of said prime mover during manual operation of the clutch.

2. In combination with a prime mover having adjustable power control means and a clutch for transmitting the power generated thereby, said clutch being movable in alternate directions between limiting positions for operation thereof, an overhauling or nonlocking actuating mechanism for operating the clutch; a lost-motion coupling between said clutch-actuating mechanism and said clutch, adapted to permit movement of the clutch over its entire range independently of said mechanism; power-operated means for driving said actuating mechanism; and automatic means rendering said driving means operative only as long as the power control means of the prime mover is adjusted within a predetermined range, said power control means being adjustable over its entire range independently of the condition of the clutch, said clutch being initially operable by hand over its entire range without uncoupling it from its actuating mechanism, including the driving means therefor, by virtue of the nonlocking character of said mechanism, while successive manual operations of said clutch are independent of the actuating mechanism by virtue of said lost-motion coupling; and said power control means remaining operative to adjust the power output of said prime mover during manual operation of the clutch.

3. In a control system for a prime mover having a clutch movable to engaged and disengaged positions for transmitting the power generated by said prime mover, power control means for controlling the power generated by said prime mover, including manually operable means for mechanical adjustment thereof; an actuating mechanism for moving said clutch to engaged and disengaged position; an electric motor for driving said mechanism; a circuit for controlling energization of the motor to operate the clutch; manually operated switch means in said circuit for controlling energization thereof; and an independent switch means in said motor control circuit operated by said manually operable power control means, said independent switch means automatically rendering the motor control circuit operative to effect operations of the clutch only as long as said manually operable power control means is adjusted within a predetermined range suitable for clutch operation.

4. In a control system for a prime mover having a clutch movable to engaged and disengaged position for transmitting the power generated by said prime mover, power control means for controlling the power generated by said prime mover including manually operable means for mechanical adjustment thereof; an actuating mechanism for moving said clutch to engaged and disengaged position; an electric motor for operating said actuating mechanism; a motor switch controlling energization of the motor to move the clutch to engaged and disengaged position; electro-magnetic relay means for operating said motor switch; a control circuit for said electromagnetic relay means; manually operated switch means for controlling energization of said control circuit; and an independent switch in said relay circuit operated by said manually operable power control means, said independent switch automatically rendering the relay control circuit operative to effect closure of said motor switch to energize the motor only as long as the adjustment of said manually operable power control means is within a predetermined range suitable for clutch operation.

5. In a control system for a prime mover having a clutch movable to engaged and disengaged position for transmitting the power generated by said prime mover, means for controlling the power generated by said prime mover including manually operable means for mechanical adjustment thereof; an actuating mechanism for moving said clutch to engaged and disengaged position; an electric motor for operating said actuating mechanism; a motor switch controlling energization of the motor to move the clutch in engaged and disengaged position; electromagnetic relay means for controlling said motor switch; a control circuit for energizing said relay means; manual circuit control means for initiating energization of said control circuit; a holding circuit shunting said manual circuit control means for automatically maintaining energization of said relay control circuit once it is energized; automatic means for deenergizing said relay circuit and rendering said holding circuit and motor inoperative upon completion of a clutch operation; and an automatic circuit control means in series with said manual circuit control means, but also shunted by said holding circuit, said automatic circuit control means being operated by said manually operable power control means for rendering said manual circuit control means operable to initiate operation of the clutch only as long as said power control means is adjusted within a predetermined range suitable for clutch operation.

6. In a control system for a prime mover having a clutch movable between a limiting engaged position and a disengaged position for transmitting the power generated by the prime mover, power control means for controlling the power generated by said prime mover including manually operated mechanical means for adjustment thereof; an actuating mechanism for moving said clutch to engaged and disengaged position, movement of at least a portion of said mechanism being arrested upon engagement of the clutch; an electric motor for operating said actuating mechanism; a circuit for controlling motor operation to operate said clutch; manually operable means in said control circuit for initiating motor operation to move the clutch to engaged or disengaged position; automatic means for controlling said circuit to interrupt motor operation during movement of the clutch to disengaged position, and for arresting movement of the clutch in disengaged position; automatic means operated by continued rotation of the motor after engagement of the clutch in response to arrest of movement of said part of the actuating mechanism, said last-named automatic means controlling said circuit to render the motor temporarily inoperative to rotate further in clutch-engaging direction; and independent switch means in said motor control circuit, operated by said power control means, said independent switch means automatically rendering said manually operable switch means operative to initiate a clutch-engaging or clutch-disengaging operation only as long as the adjustment of said power control means is within a predetermined range suitable for clutch operation.

7. In a control system for a prime mover having a clutch movable between a limiting engaged position and a disengaged position, for transmission of the power generated by the prime mover, power control means for controlling the power generated by said prime mover, including manually operated mechanical means for adjustment thereof; an actuating mechanism, including an electric driving motor, for moving said clutch to engaged and disengaged position, movement of at least a portion of said mechanism being arrested by engagement of the clutch; means in said mechanism for increasing the resistance to rotation of the motor in clutch-engaging direction to a predetermined value upon arrest of said portion of the mechanism by reason of engagement of the clutch; torque-responsive means rendered effective by continued rotation of the motor against said increased resistance after the clutch is engaged; a circuit for controlling energization of the motor to operate said clutch; manually operable switch means in said circuit for initiating motor operation to move the clutch to engaged or disengaged position; automatic switch means operated by said torque-responsive means to deenergize said motor temporarily for operation in clutch-engaging direction after the clutch is engaged; automatic means included in said mechanism for interrupting motor operation during movement of the clutch to disengaged position and for arresting the clutch in disengaged position; and independent switch means in said motor control circuit operated by said power control means, said independent switch means automatically rendering said manually operable switch means operative to initiate a clutch-engaging or clutch-disengaging operation only as long as said power control means is adjusted within a predetermined range suitable for clutch operation.

8. In a control system for a prime mover having a reverse gear for transmitting the power generated thereby, movable between alternate limiting positions for coupling the prime mover to a driven member for operation of the latter in alternate directions respectively, said reverse gear having an intermediate neutral position in which the clutch is disengaged; an actuating mechanism for moving said clutch to either of said limiting position and to its neutral position; a reversible electric motor for driving said actuating mechanism; a plurality of circuits for controlling operation of the motor; manually controlled selective switch means in said circuits to initiate motor operation to move the clutch to said engaged and disengaged positions; automatic means rendering the motor inoperative and adapted to arrest the reverse gear upon the latter reaching a selected position; means for controlling the power generated by said prime mover, including manually operated mechanical means for adjustment thereof; and independent switch means, automatically operated by said power control means and included in said circuits for rendering the manually operated selective switch means operative to initiate motor operation of the reverse gear only as long as the power control means is adjusted within a predetermined range suitable for reverse gear operation.

9. In a control system for a prime mover having a clutch for transmitting the power generated thereby, means for controlling the power generated by said prime mover, including manually operated mechanical means for adjustment thereof; a clutch-actuating mechanism for operating said clutch; an electric motor for driving said mechanism; a circuit controlling operation of the motor to operate said clutch; manually controlled switch means in said circuit for initiating motor operation to move the clutch to a desired position; automatic means for completing said operation; and independent switch means in said control circuit automatically operated by said power control means for rendering said manually controlled switch means operative only as long as the power control means is adjusted within a predetermined range, said manual switch means being adjustable to preselect a desired operation of the clutch, while inoperative to initiate said operation by reason of adjustment of said power control means outside of said predetermined range, readjustment of said power control means to a setting within said range thereupon rendering said control circuit operative to cause the motor and actuating mechanism to initiate a preselected clutch operation.

10. In a control system for a prime mover having a clutch, movable between a limiting engaged position and a disengaged position, for transmitting the power generated by the prime mover, means for controlling the power generated by said prime mover, including manually operable means for adjustment thereof; a reversible electric motor; an actuating mechanism driven by the motor for moving said clutch to said engaged position upon rotation of the motor in one direction, movement of the mechanism being limited by engagement of the clutch, and for returning said clutch to disengaged position upon rotation of the motor in the opposite direction; means for increasing the torque resistance of said mechanism to continued rotation of the motor in clutch-engaging direction upon engagement of the clutch; torque-responsive means rendered effective by increase of the torque load to a predetermined value upon continued rotation of the motor after the clutch is engaged, for operating an automatic control switch; a normally open motor switch controlling operation of the motor; electromagnetic means for engaging the motor switch to cause the motor to rotate in clutch-engaging directions; a control circuit for energizing said electromagnetic means to cause the motor to move the clutch to engaged position; and automatic switch in said control circuit operated by the aforesaid torque-responsive means upon continued rotation of the motor in clutch-engaging direction against the aforesaid predetermined torque load, after the clutch has been engaged, to interrupt said circuit, thereby disengaging the motor switch and rendering the motor temporarily inoperative; a second electromagnetic means for engaging the motor switch to cause the motor to rotate in the opposite or clutch-disengaging direction; a second control circuit for energizing the latter electromagnetic means; a manually operated switch, operable alternately with said manual switch for effecting clutch engagement, for energizing the latter circuit to cause the motor to move the clutch from engaged to neutral position; an automatic switch in the latter circuit operated by the clutch-actuating mechanism upon the clutch reaching neutral position, to interrupt said circuit, thereby disengaging the motor switch and rendering the motor temporarily inoperative; a control switch interposed in each of the control circuits for said electromagnetic means, said control switch being operated by said power control means, independently of said clutch-actuating device and its control means, to establish said control circuits only as long as the power control means is adjusted within a predetermined range corresponding to prime mover operation suitable for engagement and disengagement of the clutch, and to interrupt said control circuits whenever the power control means is adjusted outside of said predetermined range, whereby said control circuits are automatically rendered inoperative to cause the motor to engage or disengage the clutch in response to said manually operated switch means when the power generated by the prime mover is sufficiently great to cause damage to parts of the mechanism upon engagement or disengagement of the clutch, or not great enough to keep the prime mover running upon engagement of the clutch.

11. In a control system for a prime mover having a reverse gear movable between limiting positions in which the reverse gear is engaged by transmitting the power generated by the prime mover in opposite directions respectively, and to an intermediate neutral position in which the reverse gear is disengaged; means for controlling the power generated by said prime mover including manually operable means for adjustment thereof; a reversible electric motor; an actuating mechanism driven by the motor for moving the reverse gear toward alternate engaged positions upon motor rotation in corresponding alternate directions; means for increasing the torque resistance of said mechanism to continued rotation of the motor in reverse gear-engaging direction upon said reverse gear reaching either of its limiting engaged positions; torque-responsive means rendered effective by increase of said torque load to a predetermined value upon continued rotation of the motor after the reverse gear is engaged for operating automatic control switches; a normally open reversing switch for said motor; a pair of electromagnetic relay means for engaging the motor switch to cause the motor to rotate respectively in alternate reverse gear engaging directions; a pair of control circuits for said electromagnetic relay means; manually operated selector switch means for initiating energization of said circuits to cause the motor to move the reverse gear to one or the other engaged position; a pair of holding circuits shunting said selector switch means to maintain energization of the control circuits once they are energized; automatic switch means in said circuits operated by the aforesaid torque-responsive means, upon continued rotation of the motor in reverse gear engaging direction against the aforesaid predetermined torque load after engagement of the reverse gear, to interrupt said control circuits, thereby rendering said holding circuits inoperative and disengaging the motor switch to render the motor temporarily inoperative; a second pair of electromagnetic relay means for engaging the motor switch to cause the motor to rotate respectively in alternate directions for movement of the reverse gear to disengaged position; a second pair of control circuits for the latter electromagnetic relay means; automatic selector means for establishing one or the other of said circuits, depending upon the engaged position to which the reverse gear has been moved; manually controlled switch means for energizing said circuits; automatic switch means in said circuits operated by the reverse gear actuating mechanism during movement of the reverse gear toward neutral position to interrupt said circuits, whereby the motor switch is disengaged and the motor rendered temporarily inoperative; means for automatically positioning and retaining the reverse gear in neutral position upon movement thereto; switch means included in each of said electromagnetic control circuits, in series with the manually controlled switch means but shunted by said holding circuits, said switch means being automatically controlled, independently of the reverse gear, its actuating mechanism and its control means, by the power control means of said prime mover, said switch means rendering said manual circuit control means operative to initiate reverse gear operation only as long as the power generated by the prime mover is within a predetermined range suitable for operation of the reverse gear for engagement and disengagement thereof without danger of damage to any part of the prime mover, the apparatus driven thereby or the means for transmitting said power.

12. In combination, a prime mover; means including a manually operable lever movable to increase and decrease the power output of the prime mover, said lever having a normal or idling power position; a reverse gear including a clutch for transmitting the power of the prime mover in opposite directions; a reversible electric motor for operating the clutch to cause it to engage for forward or reverse operation; motor control circuits for selectively determining whether the clutch shall be shifted for forward or reverse operation; and means for rendering said circuits incapable of causing operation of the motor to alter the selected condition of the clutch when said throttle lever is out of said idling power position.

13. In combination, a prime mover; means including a manually operable lever movable to increase or decrease the power output of the prime mover, said lever having a normal or idling power position; a reverse gear including a clutch for coupling and uncoupling the prime mover to a member to be moved and in opposite directions; a reversible electric motor for operating the clutch to cause it to engage for forward or reverse operation or to disengage for idle operation; motor control circuits for selectively determining whether the clutch shall be shifted to forward, reverse or idling condition; and means for rendering said circuits incapable of causing operation of the motor to alter the selected condition of the clutch when said throttle lever is out of idling position.

14. In combination, a prime mover; means including a manually operable lever movable to increase or decrease the power output of the prime mover, said lever having a normal or idling power position; a reverse gear including a clutch for coupling and uncoupling the prime mover to a member to be moved and in opposite directions; a reversible electric motor for operating the clutch to cause it to engage for forward or reverse operation or to disengage for idle operation, motor control circuits for selectively determining whether the clutch shall be shifted to forward, reverse or idling condition; and means for rendering said circuits incapable of causing operation of the motor to engage the clutch for forward or reverse operations when said throttle lever is out of said idling power position.

15. In combination, a prime mover; means including a manually operable lever movable to increase or decrease the power output of the prime mover, said lever having a normal or idling power position; a reverse gear including a clutch for coupling and uncoupling the prime mover to a member to be moved and in opposite directions; a reversible electric motor for operating the clutch to cause it to engage for forward or reverse operation or to disengage for idle operation; motor control circuits for selectively determining whether the clutch shall be shifted to forward, reverse or idling condition; and means for rendering the said circuits incapable of causing operation of the motor to disengage the clutch from either forward or reverse operation when said throttle lever is out of said idling power position.

16. In combination, a prime mover; means including a manually operable lever movable to increase or decrease the power output of the prime mover, said lever having a normal or idling power position; a reverse gear including a clutch for coupling and uncoupling the prime mover to a member to be moved and in opposite directions; a reversible electric motor for operating the clutch to cause it to engage for forward or reverse operation or to disengage for idle operation; motor control circuits for selectively determining whether the clutch shall be shifted to forward, reverse or idling condition; and means for rendering said circuits incapable of causing operation of the motor to change the condition of the clutch from forward to reverse operation when said throttle lever is out of said idling power position.

17. In combination, a prime mover; means including a manually operable lever movable to increase or decrease the power output of the prime mover, said lever having a normal or idling power position; a reverse gear including a clutch for coupling and uncoupling the prime mover to a member to be moved and in opposite directions; a reversible electric motor for operating the clutch to cause it to engage for forward or reverse operation or to disengage for idle operation; motor control circuits for selectively determining whether the clutch shall be shifted to forward, reverse or idling condition; and means for rendering the said circuits incapable of causing operation of the motor to disengage the clutch from either forward or reverse operation when said throttle lever is out of said idling power position, said last-named means rendering said circuits capable of causing the motor to disengage the clutch when said throttle lever is returned to idling condition.

18. In combination, a prime mover; means including a manually operable lever movable to increase and decrease the power output of the prime mover, said lever having a normal or idling power position; a reverse gear including a clutch for transmitting the power of the prime mover in opposite directions; a reversible electric motor for operating the clutch to cause it to engage for forward or reverse operation; motor control circuits for selectively determining whether the clutch shall be shifted for forward or reverse operation; and means for rendering said circuits capable of causing operation of the motor to change the condition of the clutch only when said throttle lever is in said idling power position.

19. In combination, a prime mover; means including a manually operable lever movable to increase or decrease the power output of the prime mover, said lever having a normal or idling power position; a reverse gear including a clutch for coupling and uncoupling the prime mover to a member to be moved and in opposite directions; a reversible electric motor for operating the clutch to cause it to engage for forward or reverse operation or to disengage for idle operation; motor control circuits for selectively determining whether the clutch shall be shifted for forward, reverse or idling operation; and means for rendering said circuits capable of causing operation of the motor to disengage the clutch only when said throttle lever is in idling position.

ERWIN J. PANISH.

REFERENCES CITED

The following references are of record in the file of this patent:

UNITED STATES PATENTS

| Number | Name | Date |
|--------|------|------|
| 2,169,216 | Bloxsom | Aug. 15, 1939 |
| 2,238,574 | Thomas et al. | Apr. 15, 1941 |

FOREIGN PATENTS

| Number | Country | Date |
|--------|---------|------|
| 429,213 | Great Britain | May 27, 1935 |